United States Patent
Winbow et al.

(10) Patent No.: US 6,343,256 B1
(45) Date of Patent: Jan. 29, 2002

(54) ILLUMINATION CORRECTIONS TO REDUCE GEOMETRICAL ARTIFACTS IN SEISMIC DATA

(75) Inventors: Graham A. Winbow; James R. Alldridge, both of Houston; Leslie A. Wahrmund, Kingwood, all of TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 09/591,741

(22) Filed: Jun. 12, 2000

(51) Int. Cl.[7] ................................................. G01V 1/28
(52) U.S. Cl. ............................. 702/18; 367/47; 367/73; 702/17
(58) Field of Search ............................. 702/14, 17, 18; 367/73, 47

(56) References Cited

U.S. PATENT DOCUMENTS 5,206,837 A   4/1993   Beasley et al. ............... 367/38

OTHER PUBLICATIONS

Anat Canning et al., "Reducing 3–D Acquisition footprint for 3–D DMO and 3–D Prestack Migration", Geophysics, vol. 63, No. 4 (Jul.–Aug. 1998); pp. 1117–1183, 14 figs.

Peter Hubral et al., "A Unified Approach to 3–D Seismic Reflection Imaging, Part I: Basic Concepts", Geophysics, vol. 61, No. 3 (May–Jun. 1996), pp. 742–758, 5 figs.

Martin Tygel et al., "A Unified Approach to 3–D Seismic Reflection Imaging, Part II: Theory", Geophysics, vol. 61, No. 3 (May–Jun. 1996), pp. 759–775.

M. tygel et al., "Multiple Weights in Diffraction Stack Migration", Geophysics, vol. 59, No. 12 (Dec. 1993); pp. 1820–1830, 11 figs.

Norman Bleistein, "On the Imaging of Reflectors in the Earth", Geophysics, vol. 52, No. 7 (Jul. 1987); pp. 931–942, 1 fig.

Craig J. Beasley et al., "Equalization of DMO for Irregular Spatial Sampling", 62nd Annual SEG Meeting Extended Abstracts, pp. 970–973 (1992).

*Primary Examiner*—Donald E. McElheny, Jr.
(74) *Attorney, Agent, or Firm*—J. Paul Plummer

(57) ABSTRACT

A method for correcting seismic amplitudes for geometrical artifacts resulting in non-uniform illumination of reflector surfaces. The illumination is calculated for each offset as a function of spatial position. The amplitudes are scaled by a scale factor which may be the reciprocal of the illumination. Data considered to be poor quality due to low illumination may be discarded, and the amplitudes scaled further to compensate for the discarded data.

17 Claims, 2 Drawing Sheets

(1 of 2 Drawing Sheet(s) Filed in Color)

ILLUMINATION CORRECTIONS TO REDUCE GEOMETRICAL ARTIFACTS IN SEISMIC DATA

FIELD OF THE INVENTION

This invention relates generally to the field of three-dimensional (3-D) seismic prospecting. More particularly, the invention relates to a method for correcting errors in seismic amplitudes created by acquisition geometry.

BACKGROUND OF THE INVENTION

In the oil and gas industry, seismic prospecting techniques are commonly used to aid in the search for and evaluation of hydrocarbon deposits located in subterranean formations. In seismic prospecting, seismic energy sources are used to generate a seismic signal which propagates into the earth and is at least partially reflected by subsurface seismic reflectors. Such seismic reflectors typically are interfaces between subterranean formations having different elastic properties. The reflections are caused by differences in elastic properties, specifically wave velocity and rock density, which lead to differences in impedance at the interfaces. The reflections are recorded by seismic detectors at or near the surface of the earth, in an overlying body of water, or at known depths in boreholes. The resulting seismic data may be processed to yield information relating to the geologic structure and properties of the subterranean formations and potential hydrocarbon content.

The goal of all seismic data processing is to extract from the data as much information as possible regarding the subterranean formations. In order for the processed seismic data to fully represent geologic subsurface properties, the true amplitudes resulting from reflection of the input signal by the geologic target must be accurately represented. This requires that the amplitudes of the seismic data must be processed free from non-geologic effects. Non-geologic amplitude effects include mechanisms that cause the measured seismic amplitudes to deviate from the amplitudes caused by the reflection coefficient of the geologic target. These non-geologic amplitude effects can be related to acquisition of the data or to near surface effects. Examples of non-geologic amplitude effects that can be particularly troublesome are source and receiver variations, coherent noises, electrical noise or spikes, and overburden and transmission effects. If uncorrected, these effects can distort the seismic image and obscure the true geologic picture.

A seismic wave source generates a wave that reflects from or "illuminates" a portion of a reflector. As used herein, "illumination" means the imaged amplitude that would be achieved by the given seismic acquisition geometry if the reflection coefficient on the reflector were unity everywhere. The collection of sources that comprises an entire 3-D survey generally illuminates a large region of the reflector. Conventional prestack 3-D migration algorithms can produce precise images of the reflector only if illumination is relatively uniform.

In principle, the best seismic acquisition would result in each common offset (source-receiver distance) data volume having dense uniform sampling in midpoint distribution and fixed source-receiver azimuth (compass direction). If this were the case, flat lying reflectors would be uniformly illuminated (assuming velocity is a function only of depth and not of horizontal position) and, apart from noise issues, amplitudes would normally be trustworthy. With controlled amplitude processing, dipping reflectors would also have trustworthy amplitudes.

In reality, midpoint distribution is not always uniform. For example, in marine acquisition there may be gaps due for example to physical obstructions such as platforms. On land, physical obstacles to seismic acquisition are often plentiful and various. For marine acquisition, source-receiver azimuth generally varies within a survey due to multi-streamer acquisition, and/or cable feathering. In the presence of strong ocean currents or with acquisition using large numbers of parallel streamers (up to 20 streamers will be deployed from boats now under construction), azimuth variations within a survey can be large. Such azimuth variations are known to produce large variations in illumination on dipping reflectors. Azimuth variations are built into the acquisition pattern of typical land surveys.

Such irregularities in midpoint distribution and/or azimuth variation generally lead to non-uniform illumination of reflectors and irregularities in the measured seismic amplitudes. Non-uniform illumination also occurs at the edges of a seismic survey as the illumination decreases to zero across a lateral distance comparable in size to a Fresnel zone, which is on the order of a few hundred meters for typical survey parameters. All such non-uniform illumination is either not compensated for in present methods of controlled amplitude migration, or is inadequately compensated for as described below.

Consequently, prestack 3-D migrated images are often contaminated with non-geologic artifacts called geometrical effects or "acquisition footprints". Unless properly compensated for in the stacking process, the incorrect change of amplitude and signal/noise resulting from these artifacts can interfere with the ultimate interpretation of seismic images and attribute maps. Removing the effects of the acquisition footprint is thus important for accurate seismic acquisition design, processing, and interpretation.

Typical current technology for correcting for acquisition footprints includes "flex-binning". In this approach, the data are normalized to the number of hits in a "bin" (typically a rectangle of width equal to the crossline spacing and of length equal to the inline spacing). In the event a bin is empty of data, a trace is copied into the bin from a neighboring bin provided some criterion is met (e.g. the trace comes from not more than half a bin width away in a crossline direction). A basic difficulty with this approach is its inability to deal with gaps more than a bin width in size. In addition, the trace is thereby no longer in its true location.

Another method, proposed by Canning and Gardner (*Geophysics* 63, 1177–1183 (1998)), uses Voroni weighting over midpoints to correct seismic amplitudes for irregular sampling in midpoint space. This method is computationally expensive for routine application to 3-D data and does not account for varying azimuths typical of multi-cable marine acquisition.

In the method known as EQDMO, which stands for Equal Dip Moveout (ref: Beasley and Klotz, U.S. Pat. No. 5,206, 837 (1992)), the data are normalized after dip moveout. As noted by the inventors (ref: $62^{nd}$ Annual SEG Meeting Extended Abstracts pp 970–973 (1992)), this method encounters difficulties with wide azimuth acquisition. In addition, EQDMO is unable to handle large data gaps, and because the method lacks a true wave theoretical basis, it is unable to guarantee that a uniformly reflective reflector will be correctly imaged.

Therefore, there is a need for a method that works for large data gaps and large variations in azimuth. The present invention is a simple method that satisfies these needs.

SUMMARY OF THE INVENTION

In one embodiment, the present invention is a method for correcting errors in seismic amplitudes created by acquisition geometry, comprising the steps of:

(a) calculating the seismic illumination as a finction of offset, depth and x,y position, (b) scaling each seismic amplitude at each reflection point and offset by a factor equal to the reciprocal of the illumination calculated for such offset, depth and x,y position;

(c) discarding all amplitudes for offsets where the illumination is less than a pre-determined minimum value that is considered desirable for data quality reasons; and (d) normalizing the remaining seismic amplitudes to compensate for data discarded for quality reasons.

In some embodiments of the present invention, a corrected stack amplitude is obtained, in which process the stack summation is a weighted average over all offsets of the artifact-compensated (step (b) above) amplitudes, with the weighting function that accomplishes steps (c) and (d) above being either zero or unity, depending on whether the illumination is less than or greater than, respectively, the predetermined minimum value. In other embodiments, to eliminate the discontinuity in the weighting function, an intermediate illumination range is set in which the weighting function changes in value from 0 to 1 as a continuous function of illumination. In still other embodiments, that continuous finction is a cosine tail.

In other embodiments of the present invention, the amplitudes are scaled (by the reciprocal of the illumination) after stacking. In still other embodiments of the present invention, instead of the reciprocal of the illumination, some other function of illumination may be used to scale the amplitudes for nonuniform illumination.

BRIEF DESCRIPTION OF THE DRAWINGS

The file of this patent contains at least one drawing executed in color. Copies of this patent with color drawings will be provided by the Patent and Trademark Office upon request and payment of the necessary fee.

The present invention and its advantages will be better understood by referring to the following detailed description and to the attached drawings.

Figure 1:
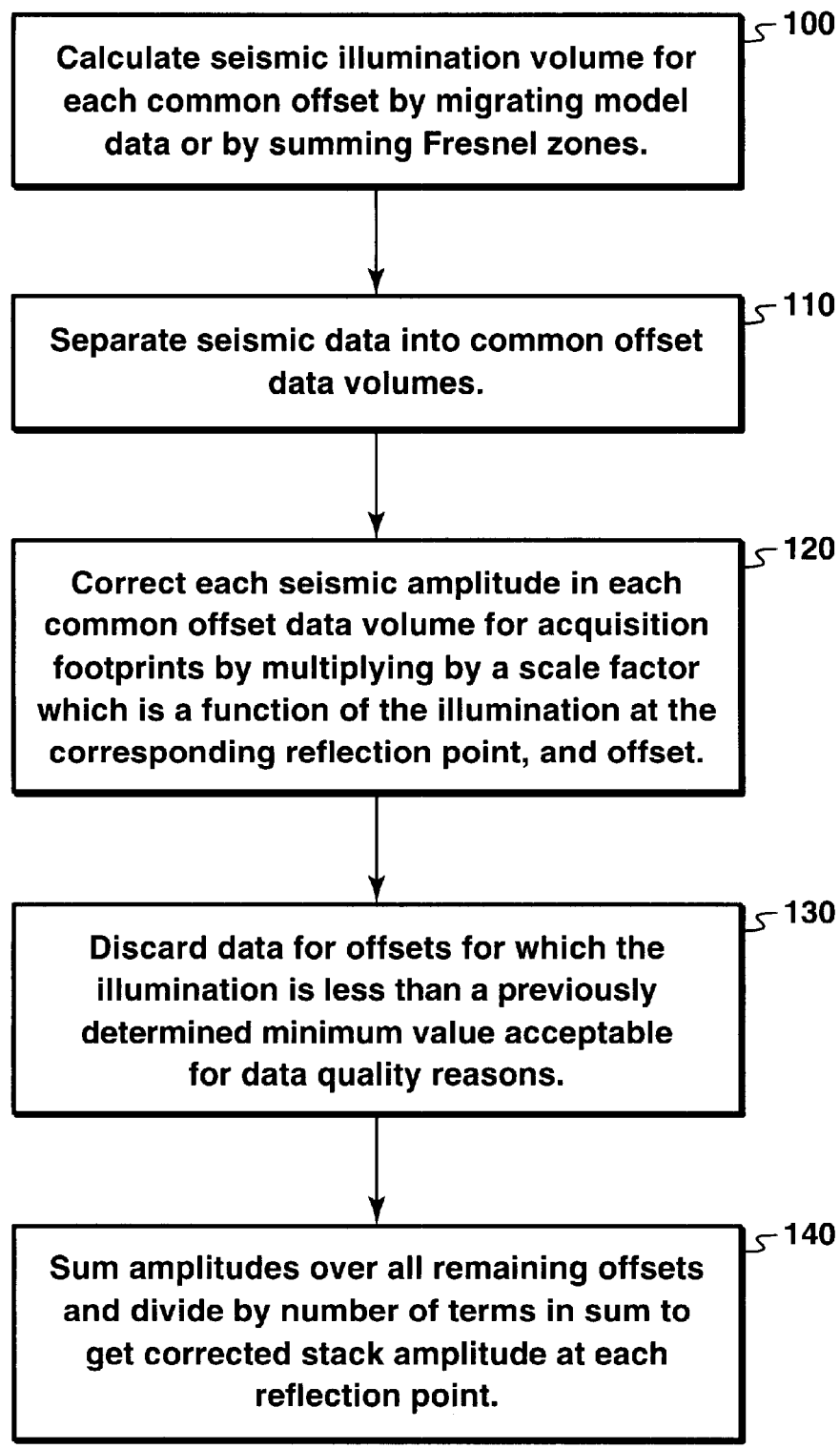
FIG. 1 is a flowchart of the present inventive method in one of its embodiments.

The present invention will be described below in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents that are included within the spirit and scope of the invention, as defined by the appended claims.

DETAILED DESCRIPTION OF THE INVENTION

As stated above, reflector illumination is defined to be the imaged amplitude achieved by the given acquisition geometry when the reflection coefficient on the reflector of interest is unity everywhere. This can be computed by constructing and migrating model data, a procedure that will be obvious to anyone skilled in the art of seismic migration. Alternatively, the illumination can be computed (with superior computational efficiency) by summing Fresnel zones on the reflector surface. In the case of a dipping reflector, the illumination function depends on the magnitude of the dip, which must be determined in advance.

The method of constructing and migrating model data is based on the premise that the seismic data will give a good indication of the depth and horizontal extent of any reflector of interest. From that information, one can construct a computer model, including the acquisition geometry and the reflector, and compute imaged amplitudes as a function of offset and reflection point position. This process must be repeated for each subsurface reflector of interest. For dipping reflectors, the angle of dip must be determined in advance and then used to adjust the calculated illumination to account for the foreshortened or expanded view the dipping reflector presents to the source.

The method of summing Fresnel zones to construct a model seismic image of a subsurface seismic reflector can be carried out as follows. First, a set of source and receiver pairs is located and a subsurface velocity function is determined. Specular reflection points are then determined on the subsurface seismic reflector for each of the source and receiver pairs. Next, a Fresnel zone is determined on the subsurface seismic reflector for each of the specular reflection points, using the subsurface velocity function. One or more seismic wavelets are then selected. Preferably, the seismic wavelets are selected to match the expected seismic wavelets at depth at the subsurface seismic reflector. Typically, this is determined by examination of the seismic data set. Next, a set of image points is defined containing the subsurface seismic reflector. Next, a synthetic seismic amplitude is determined at each of the image points by summing the Fresnel zone synthetic seismic amplitudes for all of the Fresnel zones that contain the image point, using the seismic wavelets. Finally, the model seismic image of the subsurface seismic reflector is constructed, using the synthetic seismic amplitudes at the image points. (For more details, see W. A. Schneider and G. A. Winbow: "A method for modeling seismic acquisition footprints"—Provisional U.S. patent application Ser. No. 60/124054; or see "Efficient and accurate modeling of 3-D seismic illumination," Schneider and Winbow, paper SACQ 2.3 (pages 633–636) of the Extended Abstracts of the 69th annual Society of Exploration Geophysicists meeting, Houston, Tex. 1999.)

The central concept of the present invention is to compute reflector illumination at each point on a reflector, and then to normalize the data to the illumination, thereby correcting the data for nonuniform illumination. This process can be implemented either offset-by-offset or in the stack data volume.

For some acquisition situations there are large gaps in (x,y, offset) space. This results in very low or zero illumination at some subsurface locations. In this case, instead of normalizing to the illumination, it is best to exclude the trace in question from the stack at the subsurface location in question.

Conventional stacking is accomplished with the equation $$A_{ST} = \frac{\sum_{i=1}^{n} A_i}{n} \quad (1)$$

where i labels the offset, n is the total number of contributing offsets, $A_i$ is the amplitude for the i-th offset (at a given time and x,y location), and $A_{ST}$ is the corresponding stack amplitude.

It is sometimes convenient to stack only some of the traces, for example to stack only traces whose offset is less than a preassigned length. This is usually called a near-trace stack. Far-trace stacks are also often used. Such stacks are formed by summing over a subset of the values of the variable i in equation (1), and normalizing to the number of included traces.

In some embodiments of the present invention, rather than computing illumination for each individual reflector of interest, the illumination I is computed by one of the known methods referred to above for various x,y positions and depth with offset held constant, and then interpolated to form one illumination "volume" (illumination as a function of 3-D spatial position) for each common offset data volume.

In settings where the seismic velocity v is a finction only of depth z, time migration is used and therefore the migrated time t is the convenient measure of depth, i.e., $$t = 2 \int_0^z \frac{dz}{v(z)}$$

where t is the migrated time for a depth z. In more complex settings, where v=v(x,y,z), depth migration is used instead of time migration. Herein, the vertical dimension will be referred to as "depth" or "z" with the understanding that migrated time can be used instead where subsurface conditions are consistent with that approach.

The scaled, weighted stack is formed by:

$$A_{ST} = \frac{\sum_{i=1}^{n} s_i A_i w_i}{\sum_{i=1}^{n} w_i} \quad (2)$$

where $s_i$ is a scale value to normalize every trace to uniform illumination. In some embodiments of the present invention, $s_i$ is the reciprocal of the illumination I, but it may be a more general function of illumination. It is preferable to normalize the illumination values. Perfect illumination then corresponds to I=1. The term $w_i$ is a scale factor to account for the fact that poorly illuminated data will be dominated by noise and, in some embodiments of the present invention, are discarded or given reduced weighting. This is a judgement to be made by the person performing the present inventive method. Dividing by the sum of $w_i$ over all traces normalizes the result for such data discounted because of poor quality. Not to thus normalize would be to assume erroneously that all discarded data are all noise, i.e., the signal amplitudes are zero.

For partial stacks, the treatment for the scaled weighted stack of equation (2) is the same as for equation (1): the sum is extended over a subset of values of the variable i corresponding to those included in the partial stack.

In one embodiment of the present invention, offsets having illumination less than 0.5 are completely excluded from the stack ($w_i$=0) and offsets with illumination greater than 0.8 are completely included ($w_i$=1), with $w_i$ varying linearly with I for I between 0.5 and 0.8 to scale the amplitude contributions from offsets having illumination values within that range. A quarter-wave cosine taper is used in another embodiment for data in the interval 0.5<I<0.8. These examples illustrate how $w_i$ is used in the present invention. The choice of the value of I below which data will be discarded ($w_i$=0) depends upon the amount of noise present, which in turn is very situation dependent.

The steps of the present invention, in one of its embodiments, are summarized in FIG. 1. At step 100, the seismic illumination volume is calculated for each common offset by some method such as one of the two methods discussed above. At step 110, the seismic data is separated into common offset data volumes (amplitude as a function of 3-D spatial position). At step 120, each seismic amplitude in each common offset data volume is multiplied by some function of the illumination value at the same reflection point and offset. Preferably, this function of illumination is the reciprocal of the normalized illumination.

The result of step 120 might be the desired end point of the process. In most instances, however, a corrected stack amplitude is the goal. To that end, at step 130, data that are judged too dominated by noise to give reliable information are discarded. As described above, the illumination corresponding to each offset and reflection point enables this determination to be made on a rational and automated basis. At step 140, the artifact-corrected amplitudes are summed over all offsets not discarded in step 130 and divided by the number of such offsets to yield an average stack amplitude at the given reflection point. More generally, as explained previously, after step 120, the artifact-corrected amplitude for each offset is multiplied by a weight, some number between 0 and 1, and that product is summed over all the offsets and the sum is divided by the sum of the weights. The order of occurrence of steps 120 and 130 may be interchanged.

The preceding steps can be varied to apply the artifact correction to the stack instead of separately to each common-offset data volume. The steps are simple. All the amplitude data for a given reflection point are summed over all offsets, and then divided by the sum over all offsets of the illumination value corresponding to each offset, in preferred embodiments of the present invention where the artifact correction factor is the reciprocal of the illumination. Correcting the stack amplitude in this manner is less rigorous theoretically, but in practice it often gives results that differ but little from the more rigorous offset-by-offset correction, and it is quicker.

In other embodiments of the present invention, the approach of applying the correction to the stack is generalized to allow rejection of poor quality data. The difference from the stack correction approach just explained is that the summations run over only those offsets judged not to be dominated by noise. Furthermore, as in the offset-by-offset correction, data of intermediate reliability can be scaled instead of discarded altogether. This more general embodiment of the stack correction approach is (in the case where the artifact correction factor is the reciprocal of the illumination) expressed in the following equation:

$$A_{ST} = \frac{\sum_{i=1}^{n} w_i A_i}{\sum_{i=1}^{n} w_i I_i}, \quad (3)$$

where all terms are as previously defined. As stated before, applying a correction to the stack amplitude instead of offset-by-offset is less rigorous in terms of the theoretical basis.

The present inventive method corrects seismic amplitudes for even large gaps in midpoint coverage or large azimuth variations. In addition it improves the quality of amplitudes at the edges of a survey.

Figure 2:
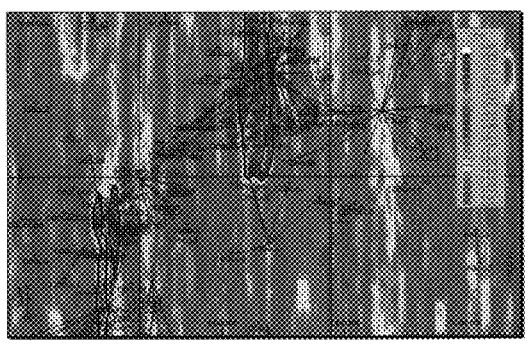
FIG. 2 shows a time slice from actual seismic data exhibiting non-uniform illumination.
Figure 3:
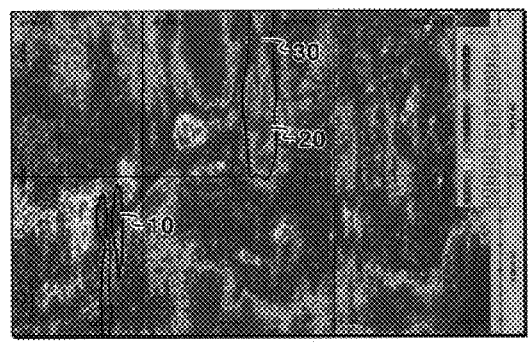
FIG. 3 shows the same data, after processing but without any correction for non-uniform illumination.
Figure 4:
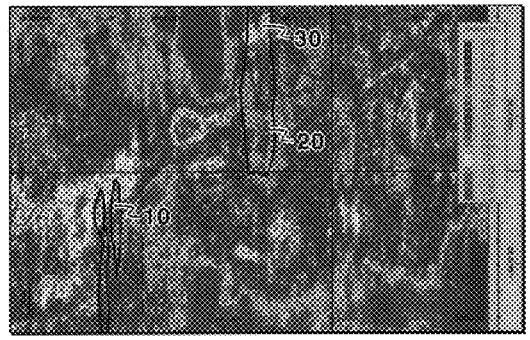
FIG. 4 shows the same data, after processing and with correction for non-uniform illumination by the present inventive method.

FIGS. 2 through 4 illustrate an application of the present invention to Gulf of Mexico data. In such data, seismic amplitude is taken as a key indicator of the likely presence of hydrocarbons in a formation. FIG. 2 illustrates the illumination. As shown by the color scale on the right hand side, the orange-red areas represent good illumination zones, while the yellow, green, and blue areas represent successively poorer illumination. Key low illumination zones are outlined in black at the lower left and the top center. FIG. 3 shows controlled amplitude data processed in the standard way without illumination corrections. Outlines of the previously mentioned low illumination zones are superimposed at 10, 20, and 30. Again, high amplitudes are represented by ("hotter") redder colors, while bluer ("cooler") colors represent lower amplitudes. It is significant that the boundaries of the low illumination zones show amplitude discontinuities, indicating that the amplitudes in these zones have been reduced by the low illumination. In FIG. 4, illumination corrections have been applied using the present inventive method. The displayed amplitudes no longer show discontinuities at the boundaries of the low illumination zones. In particular, the amplitude values appear to be much more continuous along the high amplitude trend near location 10 in the corrected data compared to the uncorrected data. The amplitude values also show more continuity in the low amplitude trend near location 20. In addition, the corrected data show the presence of previously undetected high amplitudes near locations 10 and 30.

The foregoing description is directed to particular embodiments of the present invention for the purpose of illustrating the invention. It will be apparent, however, to one skilled in the art that many modifications and variations to the embodiments described herein are possible. All such modifications and variations are intended to be within the scope of the present invention, as defined in the appended claims.

We claim:

1. A method for correcting amplitudes of a 3-D seismic dataset for acquisition footprints resulting from non-uniformities in seismic illumination of reflector surfaces in a subterranean region, said method comprising the steps of:

(a) calculating seismic illumination throughout said subterranean region as a function of x,y position, depth, and offset; and (b) multiplying each seismic amplitude in said dataset by a scale factor, said scale factor being a finction of said calculated illumination at the reflection point and offset of said amplitude, said function being selected to compensate for said non-uniformities in seismic illumination.

2. The method of claim 1, wherein said scale factor is the reciprocal of the calculated illumination value at said reflection point and offset.

3. The method of claim 1, further comprising the step of:

(c) determining a corrected stack amplitude for each reflection point by computing a weighted average over all offsets of the compensated seismic amplitudes at said reflection point from step (b), said weighting factor reflecting the degree to which said amplitude data are free from noise.

4. The method of claim 3, wherein said weighting factor is a step-function of illumination, having a value of 1 for offsets having illumination greater than a previously determined minimum value selected for data quality reasons, and having a value of 0 for offsets having illumination less than said minimum value.

5. The method of claim 3, wherein said weighting factor is 0 for illumination values between 0 and a first pre-selected value, then increases from 0 to 1 as a continuous function as illumination increases from said first pre-selected value to a second pre-selected value, then remains constant at the value of 1 for all illumination values greater than said second pre-selected value.

6. The method of claim 5, wherein said continuous function of illumination is a quarter-wave cosine tail.

7. The method of claim 6, wherein said cosine tail extends over the range of normalized illumination values from a first pre-selected value of 0.5 to a second pre-selected value of 0.8.

8. The method of claim 1, wherein the seismic illumination is calculated in step (a) by constructing and migrating model data.

9. The method of claim 1, wherein the seismic illumination is calculated in step (a) by summing Fresnel zones on said reflector surfaces.

10. A method for correcting amplitudes of a 3-D seismic dataset for acquisition footprints resulting from non-uniformities in seismic illumination of reflector surfaces in a subterranean region, said method comprising the steps of:

(a) calculating the seismic illumination throughout said subterranean region as a function of x,y position, depth and offset;

(b) assigning a weight ranging from zero to unity for each offset and reflection point based on the amount of noise included in the corresponding seismic data; and (c) determining a corrected stack amplitude for each reflection point by computing a weighted average over all offsets of the amplitudes from said reflection point and dividing the result by the weighted average over all offsets of said calculated illumination at said reflection point, both of said weighted averages using the weights assigned in step (b).

11. The method of claim 10, wherein the seismic illumination is calculated in step (a) by constructing and migrating model data.

12. The method of claim 10, wherein the seismic illumination is calculated in step (a) by summing Fresnel zones on said reflector surfaces.

13. The method of claim 10, wherein said weight in step (b) is a function of the calculated illumination from step (a) at said offset and reflection point.

14. The method of claim 13, wherein said weight is unity for illumination values greater than a predetermined minimum value, and zero for illumination values less than said predetermined minimum value, said predetermined minimum value being based on data quality considerations.

15. The method of claim 13, wherein said weight is 0 for illumination values between 0 and a first pre-selected value, then increases from 0 to 1 as a continuous function as illumination increases from said first pre-selected value to a second pre-selected value, then remains constant at the value of 1 for all illumination values greater than said second pre-selected value.

16. The method of claim 15, wherein said continuous function of illumination is a quarter-wave cosine tail.

17. The method of claim 16, wherein said cosine tail extends over the range of normalized illumination values from a first pre-selected value of 0.5 to a second pre-selected value of 0.8.

\* \* \* \* \*